(12) United States Patent
Altshuler et al.

(10) Patent No.: US 11,609,381 B2
(45) Date of Patent: Mar. 21, 2023

(54) POLARIZATION CONTROL MODULE EMPLOYING HOLLOW SHAFT MOTOR

(71) Applicant: CANON U.S.A., INC., Melville, NY (US)

(72) Inventors: Alexander Altshuler, Cambridge, MA (US); Badr Elmaanaoui, Belmont, MA (US)

(73) Assignee: Canon U.S.A., Inc., Melville, NY (US)

( * ) Notice: Subject to any disclaimer, the term of this patent is extended or adjusted under 35 U.S.C. 154(b) by 25 days.

(21) Appl. No.: 17/378,128

(22) Filed: Jul. 16, 2021

(65) Prior Publication Data

US 2023/0015126 A1    Jan. 19, 2023

(51) Int. Cl.
*G02B 6/27*    (2006.01)

(52) U.S. Cl.
CPC ........... *G02B 6/2766* (2013.01); *G02B 6/274* (2013.01)

(58) Field of Classification Search
CPC .............................. G02B 6/2766; G02B 6/274
See application file for complete search history.

(56) References Cited

U.S. PATENT DOCUMENTS

| | | | |
|---|---|---|---|
| 5,371,597 A | 12/1994 | Favin et al. | |
| 7,126,693 B2 | 10/2006 | Everett et al. | |
| 7,280,221 B2 | 10/2007 | Wei | |
| 8,373,852 B2 | 2/2013 | Ruchet et al. | |
| 9,513,496 B2 | 12/2016 | Liu et al. | |
| 9,689,661 B2 | 6/2017 | Suter et al. | |
| 9,778,020 B2 | 10/2017 | Tumlinson et al. | |
| 2009/0247862 A1 | 10/2009 | Meyer et al. | |
| 2010/0277719 A1 | 11/2010 | Chen et al. | |
| 2014/0078511 A1 | 3/2014 | Sanborn et al. | |
| 2017/0196459 A1 | 7/2017 | Lam et al. | |
| 2020/0318944 A1 | 10/2020 | Elmaanaoui et al. | |

FOREIGN PATENT DOCUMENTS

| CN | 104155754 A | * 11/2014 |
|---|---|---|
| JP | 2013195305 A | * 9/2013 |

OTHER PUBLICATIONS

De Boer, J. F., et al., "Polarization sensitive optical coherence tomography—a review", Biomedical Optics Express, Mar. 1, 2017, pp. 1838, vol. 8, No. 3.

Villiger, M., et al., "Optic axis mapping with catheter-based polarization-sensitive optical coherence tomography", Optica, Oct. 20, 2018, pp. 1329-1337, vol. 5, No. 10.

\* cited by examiner

*Primary Examiner* — Sung H Pak
(74) *Attorney, Agent, or Firm* — Canon U.S.A., Inc., IP Division

(57) ABSTRACT

A fiber optics polarization controller comprises: an optical fiber and multiple polarization stages. A first stage comprises: a motor having a hollow shaft spanning from a proximal end to a distal end along a rotational axis; and a fiber paddle affixed to and adapted to rotate with the hollow shaft. The fiber paddle has a ring-shaped body with two openings arranged opposite to each other around the ring-shaped body. A first opening of the fiber paddle is connected to the distal end of the hallow shaft substantially collinear with the rotational axis of the motor. The optical fiber is arranged spanning through the hollow shaft, entering the fiber paddle through the first opening, following around the ring-shaped body to form a fiber loop, and exiting the ring-shaped body through the second opening. A second stage is arranged in series with the first stage.

20 Claims, 5 Drawing Sheets

POLARIZATION CONTROL MODULE EMPLOYING HOLLOW SHAFT MOTOR

CROSS-REFERENCE TO RELATED APPLICATIONS n/a

BACKGROUND INFORMATION

Field of Disclosure

The present disclosure relates to optical devices. More particularly, the disclosure is directed to a novel fiber optics polarization controller employing a hollow shaft motor configured to control the state of polarization (SOP) of light propagating through an optical fiber.

Description of Related Art

The use of optical fibers for imaging probes (e.g., endoscopes or catheters) is well known in a number of imaging modalities that can benefit from small probe size. Fiber-optic based optical coherence tomography (OCT) is a well-established modality for high-resolution two-dimensional (2D) and three-dimensional (3D) imaging of biological tissues. In most optical imaging modalities, and more particularly in OCT, controlling and maintaining the state of polarization (SOP) of light in the optical fiber is essential for producing high fidelity images. In principle, a fiber with a fully rotationally symmetric design should fully preserve the polarization of light. In reality, however, the SOP of light is changed within a relatively short length of an optical fiber due to birefringence caused by imperfections of the fiber (e.g., ellipticity of the fiber core), impurities in fiber material, bending or pressure applied to the fiber during use of the imaging probe, and the like. To maintain a desired SOP of light in a fiber, manual and/or automated polarization controllers are used.

A polarization controller is an optical device configured to control the SOP of light based on the basic physics of light propagation. Light is an electromagnetic wave, and the electric field of this wave oscillates perpendicularly to the direction of propagation. When the direction of the electric field fluctuates randomly in time, it is said that light is unpolarized. If the direction of the electric field of light is well defined, it is said that light is polarized. Many common light sources such as the sun, halogen lamps, light emitting diodes (LEDs), incandescent light bulbs, and the like produce unpolarized light. On the other hand, the most common source of polarized light is a laser. A convenient way to describe polarization changes in materials and tissues is by Jones matrix analysis, where the electromagnetic field vector E is considered a two dimension complex Jones vector, and changes to the polarization state can be described by a complex 2×2 dimensional Jones matrix J. An alternative method to describe polarization is the Stokes vectors and Mueller matrices formalism. A Stokes vector is a four component real vector $S=[I, Q, U, V]^T$, where I, Q, U, V are quantities that describe intensities. This allows for characterization of an optical system with a 4×4 matrix M, known as the Mueller matrix, that relates an incident Stokes vector S to a transmitted Stokes vector S'. See, for example, "Polarization sensitive optical coherence tomography—a review" disclosed by De Boer et al., in Biomedical Optics Express, Vol. 8, No. 3, 1838, 1 Mar. 2017.

A polarization controller can be configured to transform a fixed, known polarization state into an arbitrary one, or vice versa. In the field of fiber optics, various fiber-optic devices, such as fiber optics networks, interferometers, fiber-based imaging probes, etc., require an adjustable state of polarization of light in an optical fiber. For that purpose, different types of fiber polarization controllers have been developed, and are commercially available.

For example, Thorlabs Inc., of Newton, N.J. (Thorlabs), offers motorized paddle-based polarization controllers that use stress-induced birefringence within a fiber to dynamically control the polarization state of light. In addition, U.S. Pat. No. 8,373,852 and other patents referenced therein disclose a polarization control device that uses a spring-loaded clamping device or a ferrule of shape memory material which compresses the optical fiber to induce a required amount of birefringence and thereby control the SOP of light in a fiber. U.S. Pat. No. 9,513,496 also discloses an optical fiber rotary squeezer polarization controller that uses a piezoelectric ceramic actuator to squeeze the optical fiber to change the SOP of light in the fiber.

The conventional fiber polarization controllers described in U.S. Pat. Nos. 8,373,852, 9,513,496, and those sold by Thorlabs exploit the birefringence of a fiber which is induced by bending (coiling) and/or squeezing (pressing) the fiber. The fiber polarization controller formed by coiling a fiber into fiber loops is sometimes called a "bat ear", "paddle", or "fiber loop" polarization controller. This controller works by introducing stress birefringence into the fiber, such that the total retardation (amount of birefringence) is proportional to the length of fiber and inversely proportional to its bending radius; birefringence also depends on the type of optical fiber (e.g., single mode or multimode), fiber material, number of loops, etc. Some disadvantages of the paddle-type fiber polarization controllers are the mechanical complexity and large size of the device due to the large number of parts necessary to assemble such a controller. Mechanical complex and large size fiber polarization controllers are not optimized for imaging probes (e.g., endoscopes or catheters) which can benefit from a small probe size.

Moreover, an important disadvantage of fiber polarization controllers that actively apply pressure to the optical fiber is the generation of artifacts in OCT images caused by polarization mode dispersion (PMD). PDM is a form of modal dispersion where two different polarizations of light in a waveguide, which normally travel at the same speed, travel at different speeds due to random imperfections and/or asymmetries in the fiber, causing random spreading of optical pulses. One can potentially end up with a situation where the two electromagnetic waves are polarized at 90 degrees of each other, and therefore not producing any interference pattern. More often, one ends up with a situation where the two electromagnetic waves do interfere with each other but not efficiently because the polarizations are misaligned. In this case, some of the interfering signal is lost, which causes loss of fidelity in OCT images. In order to mitigate the effect of PMD, polarization sensitive OCT (PS-OCT) modalities use polarization maintaining (PM) fibers and/or correction techniques such polarization diversity and balanced detection, as described in U.S. Pat. No. 9,689,661, and in applicant's previous disclosure in pre-grant patent application publication US 2020/0318944 A1. Nevertheless, polarization caused by mechanical variations in the fiber remain a concern for intraluminal OCT imaging probes (e.g., cardiovascular imaging probes) where the optical fiber travels into the body and goes through sharp bends to access the cardiovascular arteries.

Therefore, there is a need for improved fiber polarization controllers having enhanced functionality and lower parts count, lower design complexity, smaller size compared to conventional devices.

SUMMARY OF EXEMPLARY EMBODIMENTS

According to at least one embodiment of the present disclosure, a fiber optics polarization controller comprises: an optical fiber and one or more polarization stages. Wherein a first polarization stage comprises: a motor having a hollow shaft spanning from a proximal end to a distal end along a rotational axis of the motor; and a first fiber paddle affixed to and adapted to rotate with the hollow shaft. The first fiber paddle has a ring-shaped body with two openings arranged opposite to each other around the ring-shaped body. Wherein a first opening of the first fiber paddle is connected to the distal end of the hallow shaft substantially collinear with the rotational axis of the motor, and the second opening is arranged distal to the hallow shaft and also substantially collinear with the rotational axis of the motor. The optical fiber is arranged spanning through the hollow shaft of the motor, entering the first fiber paddle through the first opening, following around the ring-shaped body to form a first fiber loop, and exiting the ring-shaped body through the second opening.

In the fiber optics polarization controller, a second polarization stage comprises: a second fiber paddle having a ring-shaped body with a two openings arranged opposite to each other around the ring-shaped body. A first opening of the second fiber paddle is arranged distal to the second opening of the first fiber paddle substantially collinear with the rotational axis of the motor, and the second opening of the second fiber paddle is arranged distal to the second opening of the first fiber paddle and also collinear with the rotational axis of the motor. The optical fiber is further arranged spanning between the first fiber paddle and the second fiber addle, entering the second fiber paddle through the first opening thereof, following around the ring-shaped body of the second fiber paddle to form a second fiber loop, and exiting the ring-shaped body of the second fiber paddle through the second opening thereof.

In some embodiments, the first and second openings of the first or second fiber paddles are arranged around the ring-shaped body opposite to each other and substantially tangential to the ring-shaped body. In other embodiments, the first and second openings of the first or second fiber paddles can be arranged diametrically opposite to each other around the ring-shaped body. In some embodiments, the ring-shaped body of the first or second fiber paddles includes a circular inner surface adapted to support the optical fiber disposed along the circular inner surface to form the first or second fiber loop. In other embodiments, the ring-shaped body of the first or second fiber paddles includes a circular outer surface adapted to support the optical fiber disposed along the circular outer surface to form the first or second fiber loop.

In some embodiments, the ring-shaped body of the first or second fiber paddles includes a plurality of bosses protruding radially inward from the circular inner surface and adapted to guide and support the optical fiber along the circular inner surface. In other embodiments, the ring-shaped body of the first or second fiber paddles includes a plurality of bosses protruding radially outward from the circular outer surface and adapted to guide and support the optical fiber along the circular outer surface.

Advantageously, a fiber polarization controller with lower parts count, lower design complexity, and smaller size compared to conventional devices is achieved. These and other objects, features, and advantages of the present disclosure will become apparent upon reading the following detailed description of exemplary embodiments of the present disclosure, when taken in conjunction with the appended drawings, and provided claims.

DETAILED DESCRIPTION OF EXEMPLARY EMBODIMENTS

Figure 1:
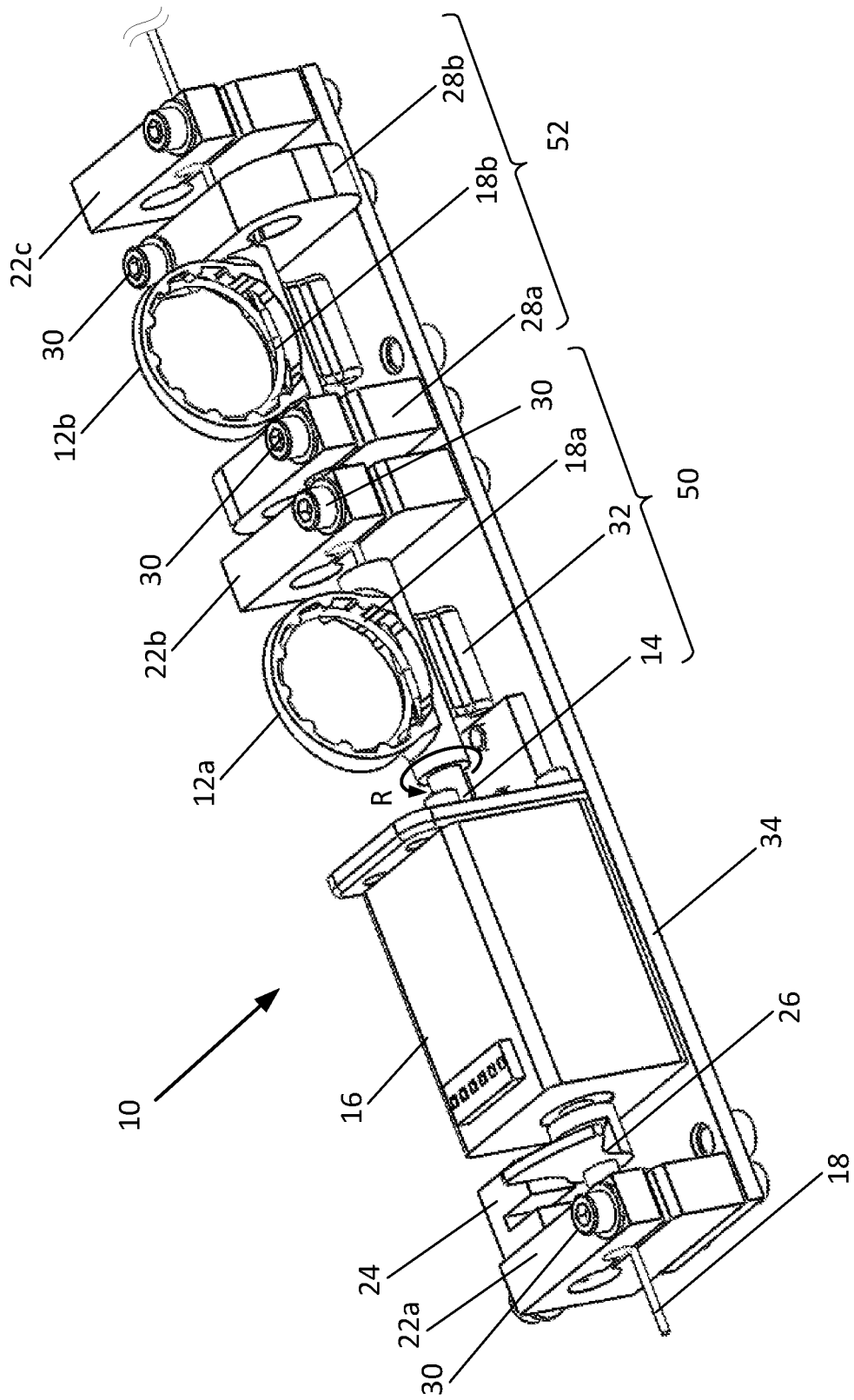
FIG. 1 is a perspective view of a paddle-type polarization controller comprised of multiple polarization stages, including at least a first polarization control module having a motor controlled fiber loop, and at least a second polarization control module having a manual controlled fiber loop, according to an embodiment of the present disclosure.

Before the various embodiments are described in further detail, it is to be understood that the present disclosure is not limited to any particular embodiment. It is also to be understood that the terminology used herein is for the purpose of describing exemplary embodiments only, and is not intended to be limiting.

Throughout the figures, the same reference numerals and characters, unless otherwise stated, are used to denote like features, elements, components or portions of the illustrated embodiments. In addition, while the subject disclosure is described in detail with reference to the enclosed figures, it is done so in connection with illustrative exemplary embodiments. It is intended that changes and modifications can be made to the described exemplary embodiments without departing from the true scope of the subject disclosure as defined by the appended claims. Although the drawings represent some possible configurations and approaches, the drawings are not necessarily to scale and certain features may be exaggerated, removed, or partially sectioned to better illustrate and explain certain aspects of the present disclosure. The descriptions set forth herein are not intended to be exhaustive or otherwise limit or restrict the claims to the precise forms and configurations shown in the drawings and disclosed in the following detailed description.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached", "coupled" or the like to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown in one embodiment can apply to other embodiments. It will also be appreciated by those of skill in the art that references to a structure or feature that is disposed "adjacent" to another feature may have portions that overlap or underlie the adjacent feature.

The terms first, second, third, etc. may be used herein to describe various elements, components, regions, parts and/or sections. It should be understood that these elements, components, regions, parts and/or sections are not limited by these terms of designation. These terms of designation have been used only to distinguish one element, component, region, part, or section from another region, part, or section. Thus, a first element, component, region, part, or section discussed below could be termed a second element, component, region, part, or section merely for purposes of distinction but without limitation and without departing from structural or functional meaning.

As used herein, the singular forms "a", "an", and "the" are intended to include the plural forms as well, unless the context clearly indicates otherwise. It should be further understood that the terms "includes" and/or "including", "comprises" and/or "comprising", "consists" and/or "consisting" when used in the present specification and claims, specify the presence of stated features, integers, steps, operations, elements, and/or components, but do not preclude the presence or addition of one or more other features, integers, steps, operations, elements, components, and/or groups thereof not explicitly stated. Further, in the present disclosure, the transitional phrase "consisting of" excludes any element, step, or component not specified in the claim. It is further noted that some claims or some features of a claim may be drafted to exclude any optional element; such claims may use exclusive terminology as "solely," "only" and the like in connection with the recitation of claim elements, or it may use of a "negative" limitation.

The term "about" or "approximately" as used herein means, for example, within 10%, within 5%, or less. In some embodiments, the term "about" may mean within measurement error. In this regard, where described or claimed, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range, if recited herein, is intended to be inclusive of end values and includes all sub-ranges subsumed therein, unless specifically stated otherwise. As used herein, the term "substantially" is meant to allow for deviations from the descriptor that do not negatively affect the intended purpose. For example, deviations that are from limitations in measurements, differences within manufacture tolerance, or variations of less than 5% can be considered within the scope of substantially the same. The specified descriptor can be an absolute value (e.g. substantially spherical, substantially perpendicular, substantially concentric, etc.) or a relative term (e.g. substantially similar, substantially the same, etc.).

Unless specifically stated otherwise, as apparent from the following disclosure, it is understood that, throughout the disclosure, discussions using terms such as "processing," "computing," "calculating," "determining," "displaying," or the like, refer to the action and processes of a computer system, or similar electronic computing device, or data processing device that manipulates and transforms data represented as physical (electronic) quantities within the computer system's registers and memories into other data similarly represented as physical quantities within the computer system memories or registers or other such information storage, transmission or display devices. Computer or electronic operations described in the specification or recited in the appended claims may generally be performed in any order, unless context dictates otherwise. Also, although various operational flow diagrams are presented in a sequence(s), it should be understood that the various operations may be performed in other orders than those which are illustrated or claimed, or operations may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "in response to", "related to," "based on", or other like past-tense adjectives are generally not intended to exclude such variants, unless context dictates otherwise.

The fiber optics polarization controller of present disclosure may be applicable to medical devices that use a fiber-based optical probe, such as a spectroscopic apparatus (e.g., an endoscope), an optical coherence tomographic (OCT) apparatus, or a combination of such apparatuses (e.g., a multi-modality optical probe). Some embodiments of an optical probe and portions thereof are described in terms of their state in a three-dimensional space. As used herein, the term "position" refers to the location of an object or a portion of an object in a three-dimensional space (e.g., three degrees of translational freedom along Cartesian X, Y, Z coordinates); the term "orientation" refers to the rotational placement of an object or a portion of an object (three degrees of rotational freedom—e.g., roll, pitch, and yaw); the term "posture" refers to the position of an object or a portion of an object in at least one degree of translational freedom and to the orientation of that object or portion of object in at least one degree of rotational freedom (up to six total degrees of freedom); the term "shape" refers to a set of posture, positions, and/or orientations measured along the elongated body of the object.

As it is known in the field of medical devices, the terms "proximal" and "distal" are used with reference to the manipulation of an end of an instrument extending from the user to a surgical or diagnostic site. In this regard, the term "proximal" refers to the portion (e.g., a handle) of the instrument closer to the user, and the term "distal" refers to the portion (tip) of the instrument further away from the user and closer to a surgical or diagnostic site. It will be further appreciated that, for convenience and clarity, spatial terms such as "vertical", "horizontal", "up", and "down" may be used herein with respect to the drawings. However, surgical instruments are used in many orientations and positions, and these terms are not intended to be limiting and/or absolute.

As used herein the term "catheter" generally refers to a flexible and thin tubular instrument made of medical grade material designed to be inserted through a narrow opening into a bodily lumen (e.g., a vessel) to perform a broad range of medical functions. The more specific term "optical catheter" refers to a medical instrument comprising an elongated bundle of one or more flexible light conducting fibers disposed inside a protective sheath made of medical grade material and having an optical imaging function. A particular example of an optical catheter is fiber optic catheter which comprises a sheath, a coil, a protector and an optical probe. In some applications a catheter may include a "guide catheter" which functions similarly to a sheath.

In the present disclosure, the terms "optical fiber", "fiber optic", or simply "fiber" refers to an elongated, flexible, light conducting conduit capable of conducting light from one end to another end due to the effect known as total internal reflection. The terms "light guiding component" or "waveguide" may also refer to, or may have the functionality of, an optical fiber. The term "fiber" may refer to one or more light conducting fibers. An optical fiber has a generally transparent, homogenous core, through which the light is guided, and the core is surrounded by a homogenous cladding. The refraction index of the core is larger than the refraction index of the cladding. Depending on design choice some fibers can have multiple claddings surrounding the core.

<Polarization Controller>

Figure 2:
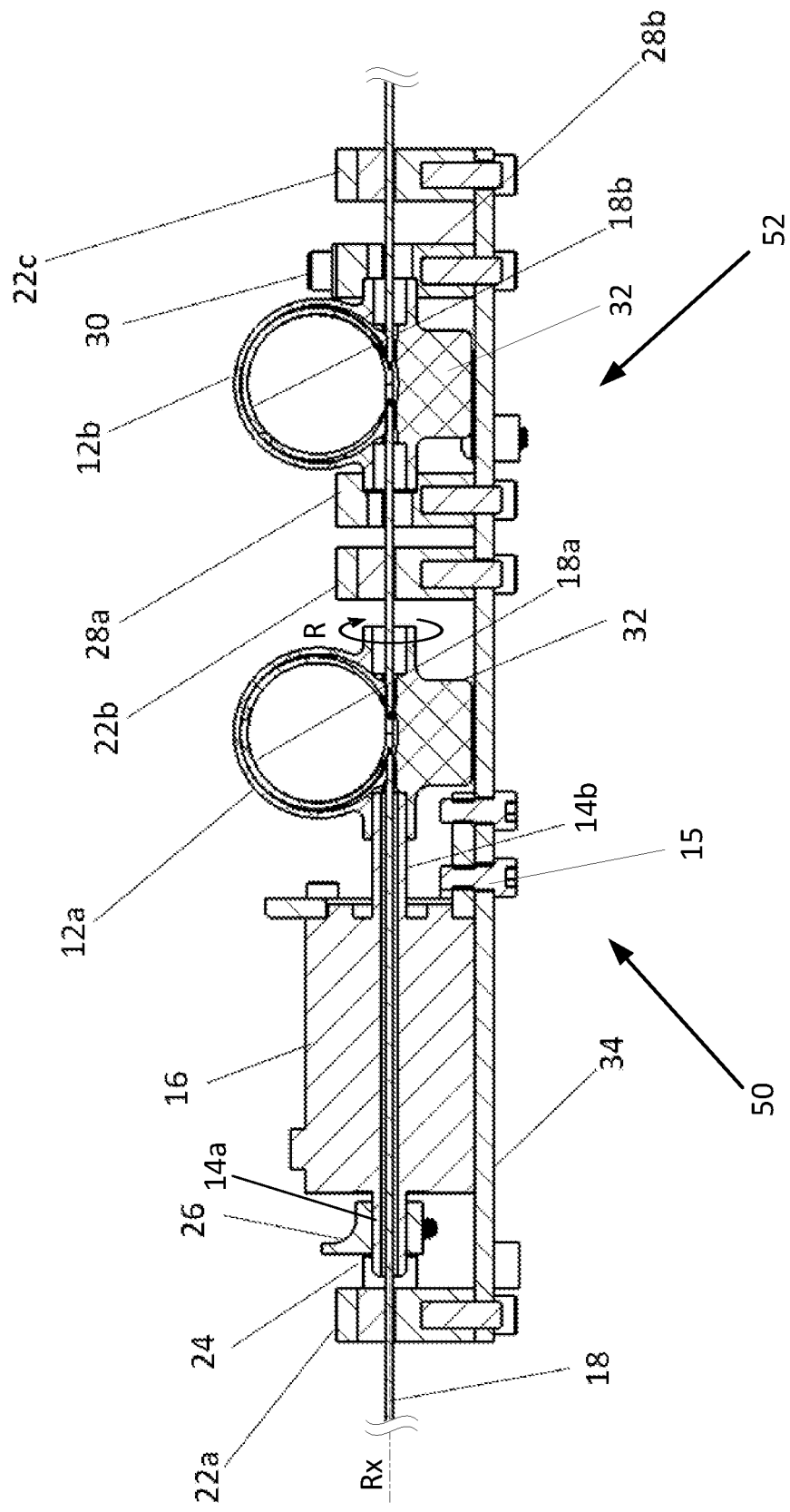
FIG. 2 is a cross-sectional view in the lengthwise direction of a paddle-type polarization controller comprised of multiple polarization stages, according to an embodiment of the present disclosure.

FIG. 1 shows a perspective view and FIG. 2 shows a cross-sectional view taken in a lengthwise direction of a fiber optics polarization controller 10 according to an embodiment of the present disclosure. The polarization controller 10 is a hybrid polarization controller comprised of a first polarization stage 50 and a second polarization stage 52 mounted in series on a base plate 34 (support member).

The first polarization stage 50 is an automated polarization control module which includes a motor 16 and a first paddle 12a. The second polarization stage 52 is a manual polarization control module which includes a second paddle 12b. The motor 16 is an electric motor having a hollow shaft 14. The hollow shaft 14 spans through the body of the motor 16 from a first end 14a (proximal end) to a second end 14b (distal end). The first paddle 12a is rigidly affixed to the second end 14b of the hollow shaft 14 of motor 16. To that end, a connecting portion 38a of the first paddle 12a may be glued to, clamped on, or even integrally incorporated into the second end 14b of hollow shaft 14.

The motor 16 used in one embodiment is a stepper motor with a zero position flag 26 mounted opposite to the first paddle 12a. That is, the zero position flag 26 is mounted on the first end 14a (proximal end) of the hollow shaft 14. An optical sensor 24 mounted stationary on the plate 34, and not mechanically connected to the hollow shaft 14 senses the flag 26 during rotational movement of the hollow shaft 14. The stepper motor 16 may additionally or alternatively have a rotary encoder or resolver. Rotary encoders and resolvers generally measure the speed, the position, and/or the direction of rotation of the shaft. They provide real-time feedback of the motor operation to programmed controllers using hardware connections. This feedback is used to automatically adjust the power delivered to the motor to obtain the desired operating characteristics (e.g., amount of birefringence). Encoders come in many varieties; encoders can make use of sensing technologies like optical, inductive, capacitive, magnetic, or laser, but most encoders use optical sensing enabled by one or more light emitting diodes (LEDs), a photodetector, and a spinning coded wheel mounted on the shaft of the motor. According to the different sensing and/or reading methods, rotary encoders can provide absolute or incremental rotational values in digital format. Resolvers are rotary transformers that provide an analog output as Cartesian coordinates of the angular position of the shaft, and this information can be converted to speed, angle, and/or direction of rotation by the controller. In other embodiments, the motor 16 may be of any other type of controllable rotation motors, such as a servo motor, a brush or brushless DC motor, an ultrasonic motor (USM), or a galvo motor for quick response.

The motor 16 is rigidly mounted to the base plate 34 by any known method of attachment, such as by one or more bolts 15. A plurality of fiber clamps 22a, 22b, and 22c is also mounted on the same base plate 34, and configured to secure an optical fiber arranged along a longitudinal axis Lx. A first fiber clamp 22a is mounted on the first side (proximal side) of the motor 16 aligned with the motor rotational axis (Rx). A second fiber clamp 22b is mounted distally to the motor 16 after the first paddle 12a; and a third fiber clamp 22c is mounted at the distal end of the base plate 34 after the second paddle 12b. The second fiber clamp 22b and third fiber clamp 22c are also aligned to be collinear with the motor rotational axis. Each of the fiber clamps 22a, 22b, and 22c includes one or more set screws 30. An optical fiber 18, which is enclosed in a protective jacket (not shown), is inserted through the first fiber clamp 22a, then guided through the hollow shaft 14 of motor 16, and inserted into the first paddle 12a. In the first paddle 12a, the fiber 18 makes a first loop 18a, and emerges from the first polarization stage 50 through the second fiber clamp 22b. After insertion through the first polarization stage 50, the fiber 18 is locked in the fiber clamps 22a and second fiber clamp 22b by tightening the set screws 30 of each clamp.

The second stage 52 of the polarization controller 10 includes the second paddle 12b supported by a pair of paddle clamps 28a and 28b. The second stage 52 is mounted on the base plate 34 in series and, preferably, coaxial with the first stage 50. The third fiber clamp 22c supports and restrains the fiber 18 as it exits from the polarization controller 10 along the unit longitudinal axis. In this manner, the plurality of fiber clamps 22a, 22b, and 22c are configured to support the optical fiber 18 at a corresponding plurality of support points collinear with the longitudinal axis of the first and second polarization stages. The fiber 18 can be a single mode fiber optical patch cable jacketed and terminated with FC/PC or FC/APC connectors on both ends. In addition, each of the first and second paddles can accommodate one or more fiber loops. The fiber clamps (22a, 22b, or 22c) may include commercially available post-mountable fiber clamps such as, for example, Thorlabs' fiber clamps model T711-250 with a precision V-groove and rubber pad designed to clamp onto the buffer jacket of single mode or multimode fibers without damaging them.

In the polarization controller 10 disclosed herein (commonly called a paddle-type controller), polarization in the fiber 18 is induced by coiling the fiber in a loop of a certain diameter and rotating the fiber paddle, thus creating bending stress in the looped fiber and, consequently, generating birefringence to modify the SOP of the light propagating through the fiber. Unlike conventional techniques (e.g., as described in U.S. Pat. Nos. 8,373,852 and 9,513,496), the polarization controller 10 does not squeeze or compress the fiber to generate birefringence. By no applying pressure to the fiber, polarization mode dispersion (PDM) is prevented or at least minimized.

The loop diameter may be calculated from the fiber dimensions and the wavelength of the passing light, in a known manner. The amount of birefringence induced in the fiber 18 will be a function of the fiber cladding diameter, the spool diameter (substantially fixed) corresponding to the fiber paddle diameter, the number of fiber loops per spool, and the wavelength of the light. Control of rotation of the polarization plane is achieved by rotating the first paddle 12a with the motor 16 (for the first stage) and/or by manually rotating the second paddle 12b (for the second stage).

Furthermore, it will be appreciated by persons of ordinary skill in the art that the number and type of stages in any combination may be determined for each particular polarization control requirement without deviation of the scope of the present disclosure. For example, a polarization controller comprised of three motorized polarization stages each replicating the first stage 50 described in the embodiment will be as well conceivable. Also, combinations of one or more motorized polarization stages each replicating the first stage 50 and one or more manual polarization stages each replicating the second state 52 will be conceivable as well.

Paddle rotation can be controlled by programmed microcontrollers or a signal processing device integrated within any applicable system. Paddle movements such as homing, jogging, and absolute positioning can be user controlled via an interactive graphical user interface (GUI) based on preprogrammed software algorithms. To control the polarization paddles without user intervention, for example, in a closed loop feedback system, those skilled in the art can take advantage of known and commercially available motion control software packages, such as Kinesis® available from Thorlabs.

<Structure of a Fiber Paddle>

Figure 3A:
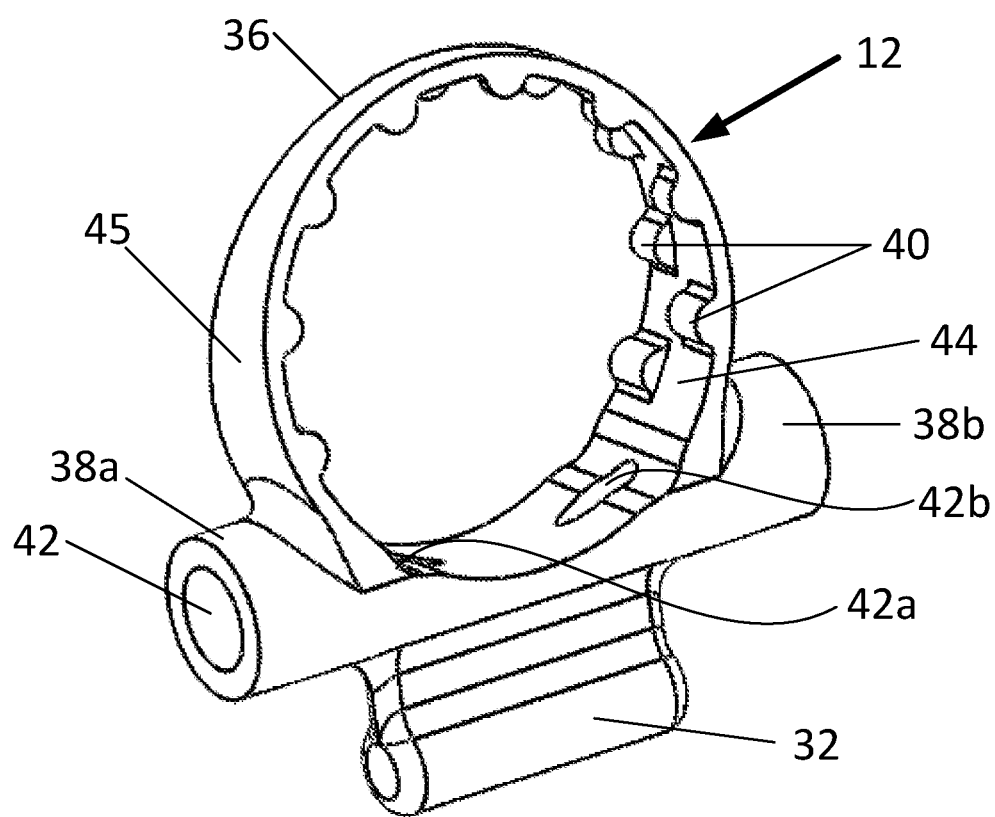
FIG. 3A is a perspective view and FIG. 3B is a cross-sectional view of a fiber paddle 12 according to an embodiment of the present disclosure.
Figure 3B:
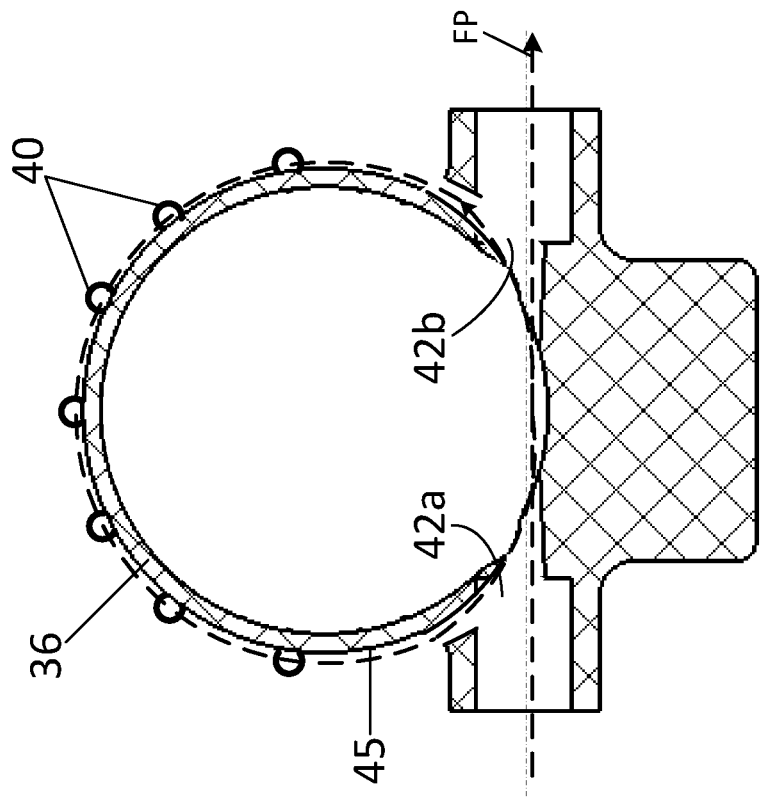

FIG. 3A and FIG. 3B illustrate an embodiment of a single fiber paddle 12 used in the embodiment of the present disclosure. FIG. 3A is a perspective view and FIG. 3B is a cross-sectional view of a fiber paddle 12. The fiber paddle 12 includes a loop body 36 with two mounting hubs 38a-38b adapted for precision mounting either on the motor shaft 14 or on a paddle support 28. The loop body 36 is a ring-shaped structure having a circular inner surface 44 and an outer surface 45. The inner surface 45 includes a plurality of bosses 40 alternately arranged on the edge of the ring-shaped structure and protruding towards the center point (axis) of the ring-shaped structure. The outer surface 45 is linked (integrated with) a weight counterbalance 32. The mounting hubs 38a and 38b respectively include a lead-in entry port 42a and a lead-out exit port 42b. The first paddle 12a can be precision mounted onto the motor shaft 14 by connecting the inside bore of the lead-in entry port 42a to the outer surface of the distal end 14b of hollow shaft 14. The second paddle 12b can be precision mounted on the paddle supports 28a-28b by connecting the hub outside surface on each side of the paddle to the bore of the paddle supports 28a-28b. A through hole 42 substantially tangential to the circular inner surface 44 of the loop structure 36 allows for the fiber 18 to enter the paddle through lead-in entry port 42a and exit the paddle though the lead-out exit port 42b tangential to the fiber loop 18a. In other words, the through hole 42 is a fiber-guiding conduit formed substantially tangential to the circular inner surface 44, and it allows the fiber to enter and exit the paddle tangentially to the fiber loop 18a.

In each fiber paddle 12, upon entering the loop body 36, the fiber 18 is guided and made to follow a fiber loop (FP) along the circular inner surface 44 to make a substantially circular loop inside the ring-shaped structure (see FIG. 3A). A series of bosses 40, which are arranged staggered on either side of the circular inner surface 44 inside the loop structure 36, are adapted to firmly hold the fiber 18 against the circular inner surface 44. The weight counterbalance 32 brings the center of mass of the loop body 36 to be aligned with the motor rotational axis. The fiber paddle 12 with its bosses 40 and weight counterbalance 32 is preferably injection molded of lightweight, rigid, and dimensionally stable material. Alternatively, the fiber paddle 12 can be made by additive manufacturing (i.e., 3D printed).

Figure 3C:
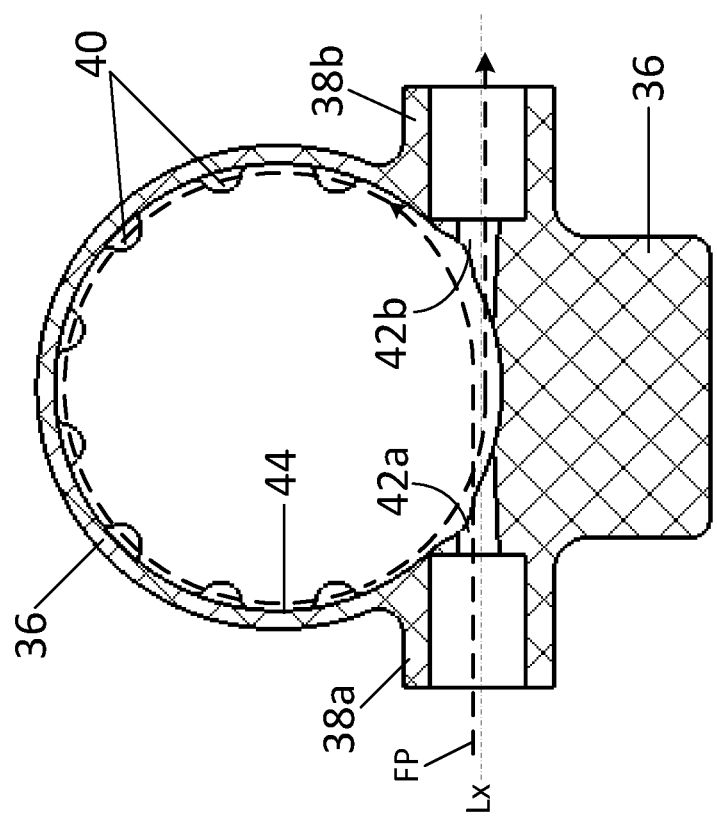
FIG. 3C is a cross-sectional view of a fiber paddle 12 according to another embodiment of the present disclosure.

In the present disclosure, FIG. 3A and FIG. 3B show one example of the manner in which the fiber paddle 12 can be structured to provide the necessary birefringence and change the SOP of light traveling through the fiber 18. It should be understood by those skilled in the art, the fiber paddle 12 is not limited to the illustrated structure. For example, substantially similar or the same polarization control can be achieved by forming the fiber loop (FP) on the outer surface 45 of the paddle body 36 and arranging the bosses 40 staggered and protruding radially outward from the outer surface 45, as shown in FIG. 3C. In this case, the fiber conduit 42 including the fiber entry port 42a and fiber exit port 42b will be substantially tangential to the outer surface 45. It will be understood by those skilled in the art that the fiber paddles of FIG. 3B and FIG. 3C can be combined and/or alternated. For example, the first fiber loop 18a can be formed along the inner circular surface 44, and the second fiber loop 18b can be formed along the outer circular surface 45 or vice versa. In this manner, the diameter of the fiber loop can be changed to fine tune the desired amount of birefringence for an appropriate polarization control.

<Imaging System with Polarization Control Module Employing Hollow Shaft Motor>

Figure 4:
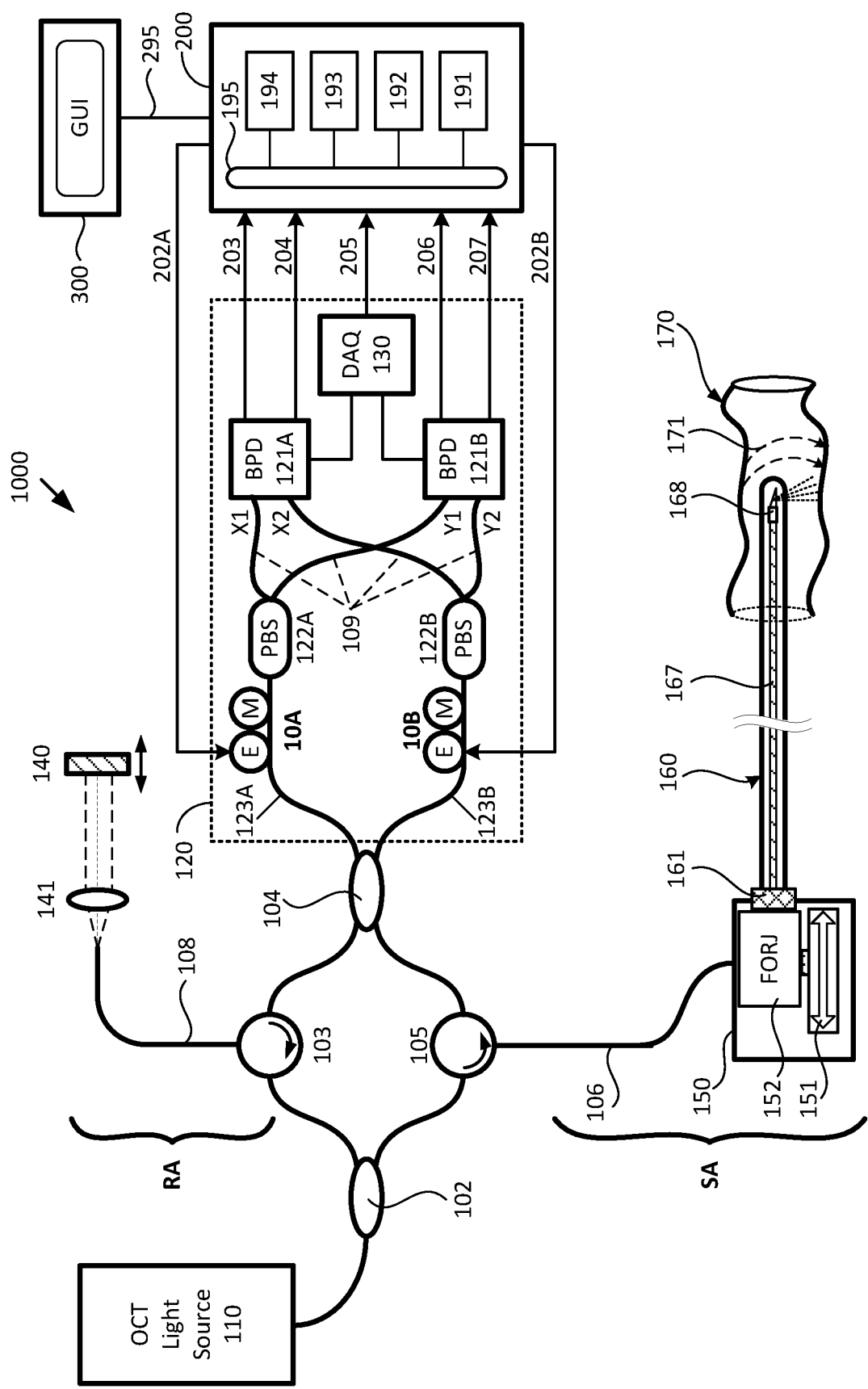
FIG. 4 illustrates an exemplary embodiment of an OCT apparatus or system for utilizing a novel fiber optics polarization controller employing a hollow shaft motor in accordance with one or more aspects of the present disclosure.

FIG. 4 illustrates an exemplary embodiment of an OCT imaging modality or system 1000 equipped with a fiber optics polarization controller employing a hollow shaft motor in accordance with one or more aspects of the present disclosure. The system 1000 is comprised of an interferometer having a sample arm (SA) and a reference arm (RA), an OCT light source 110, an optical receiver unit 120, data acquisition (DAQ) unit 130, and a computer system 200. The computer system 200 includes or is connected to a display device 300 and may be connected to a non-illustrated external server apparatus such as a picture archiving and communication system (PACS). The sample arm includes a patient interface unit (PIU) 150, and a fiber-based OCT catheter 160. The PIU 150 includes a fiber optic rotary joint (FORJ) 152, a pullback unit 151 (e.g., a motorized x-y stage and a z-axis piezo stage). The computer 200 includes a central processing unit (CPU) 191, a storage memory (ROM/RAM) 192, a user input/output (I/O) interface 193, and a system interface 194. The various functional components of the computer 200 are operatively connected and configured to communicate with each other via physical and logical data lines (a DATA BUS) 195. Storage memory 192 includes one or more computer-readable and/or writable media, and may include, for example, a solid-state drive (SSD) or magnetic hard disk drive (HHD), an optical disc (e.g., a DVD®, a Blu-ray®, or the like), a magneto-optical disk, semiconductor memory (e.g., a non-volatile memory card, Flash® memory, SRAM, DRAM), an EPROM, an EEPROM, etc. Storage memory 192 may store computer-readable data and/or computer-executable code including Operating System (OS) programs, and control and processing programs.

The interferometer includes an OCT light source 110 made of a swept source (SS) laser which emits a pulsed laser signal (pulsed light) in a center wavelength 1310 nm+/−50 nm. The laser signal is split at a first splitter 102 where a portion (e.g., 90%) of the laser intensity goes towards the sample arm and the remainder (10%) of the intensity signal goes towards the reference arm. Each optical path then travels through a dedicated 3-way circulator.

The reference arm includes a first circulator 103 connected to a fiber 108 which guides the laser signal to a motorized delay line (MDL). The MDL includes a lens (collimating component) 141 and a mirror (reflector) 140. A goal of the MDL is to adjust the optical path length (OPL) of the reference arm to match the OPL of the sample arm (both reference and sample arms must have the exact same path length within a certain coherence length to generate interference). FIG. 4 shows graphically that the light travels out of the optical fiber 108 into free space, then is collimated by lens 141, travels to moving mirror 140, and returns back along the same path into the optical fiber 108.

In the same manner, the sample arm includes a circulator 105 connected to the patient interface unit (PIU) 150 via an optical fiber 106. The catheter (probe) 160 is connected to the PUI 150 via a catheter connector 161. The laser signal in the sample arm is guided by the circulator 105 towards the PIU 105 via fiber 106. In the PIU 150, the laser signal goes through the fiber optics rotary junction (FORJ) 152, which enables the laser signal to travel from a static optical fiber to another rotating fiber 167 arranged inside the catheter. The laser signal then travels to the distal end of the catheter where a distal optics assembly 168 delivers the laser signal a sample 170 (e.g., vascular tissue). The sample 170 is scanned (irradiated) by a rotating beam of radiation in a helical path 171. A portion of the laser signal is reflected and/or back-scattered by the sample, and collected by distal optics assembly 168 of the rotating optical probe. The collected optical signal travels back to the FORJ 152, and then is guided to the circulator 105 though the fiber 106.

As both signals travel back through the sample arm and reference arm, respectively, they go through their respective 3-way circulators, and are combined by an optical coupler/splitter 104. The optical receiver unit 120 starts at this point where the newly-combined signal (an interference signal) is split into two signals of approximately equal intensity (50/50). From the optical coupler/splitter 104, a first signal S1 goes through a first polarization control module 10A and proceeds to a first polarization beam splitter (PBS) 122A. A second signal S2 goes through a second polarization control module 10B and proceeds to a second polarization beam splitter (PBS) 122B. Each PBS 122A and 122B splits the interference signal according to its predefined axis orientation. The first PBS 122A splits the first signal S1 into a first polarized signal X1 and a second polarized signal X2, where the first signal X1 can be P-polarized and the second signal X2 can be S-polarized (i.e., PBS 122A can output orthogonally polarized signals). Similarly, the second PBS 122B splits the second signal S2 into a first polarized signal Y1 which can be P-polarized and a second polarized signal Y2 which can be S-polarized (i.e., PBS 122B can output orthogonally polarized signals).

The two polarization control modules 10A and 10B are hybrid polarization modules. The first polarization control module 10A includes an electronically controlled motorized polarization stage (E) and a manually controlled polarization stage (M), which respectively correspond to the first electronically controlled polarization stage 50 and the second manually controlled stage 52 as those described with reference to FIG. 1 and FIG. 2. The second polarization control module 10B also includes an electronically controlled motorized polarization stage (E) and a manually controlled polarization stage (M). In the present disclosure, a hybrid polarization control module includes at least one polarization stage configured to be controlled electronically via a hollow shaft motor, and at least one polarization stage configured to be controlled manually by a user. For example, each polarization control module can include an assembly made of two polarization controllers including one motorized and one manual. In some embodiments, a hybrid polarization control module can have more than one electronically controlled motorized polarization stage (E) and more than one manually controlled polarization stage (M).

The polarization controllers 10A and 10B can be configured to control the polarization of the optical signals according to the manner in which the polarizing beam splitters 121A and 121B need to transmit the optical signals. After each PBS splits up the optical signals from each polarizing controller, at least four (4) polarized optical signals, for example, signals X1, X2, Y1 and Y2 are generated by the optical receiver unit 120. These four polarized signals are sent to the balanced photo-detectors BPD 121A and BPD 121B via polarization maintaining (PM) fibers 109.

The BPD 121A may be configured to generate a balanced output, and also may generate two raw monitor outputs 203-204. Similarly, the BPD 121B may be configured to generate a balanced output, and also may generate two raw monitor outputs 206-207. As such, each of the first and second BPDs 121A and 121B may include a 3-output BPD. In this manner, from the first BPD 121A and from the second BPD 121B, the main balanced output may go to the OCT DAQ 130 to collect OCT data 205. The OCT data 205 may be passed to computer 200 for image processing.

The raw monitor outputs 203-204 from the first BPD 121A and the raw monitor outputs 206-207 from the second BPD 121B preferably are used as inputs for the computer 200 (polarization control unit). The polarization control unit uses the raw output values 203-204 from the first BPD 121A as feedback to generate a control signal 202A to electronically control the motorized polarization control module (E) of the first polarization controller 10A. Similarly, the polarization control unit uses the raw output values 206-207 from the second BPD 121B as feedback to generate a control signal 202B to electronically control the motorized polarization control module (E) of the second polarization controller 10B.

An objective of the polarization control unit is to achieve optimal polarization-diversity and accurate balanced detection. Balanced detection may be achieved when x1=x2 and y1=y2, and polarization-diversity is achieved when x1=y1 and x2=y2. Further details about automatic polarization control are disclosed in applicant's previous disclosure in pre-grant patent application publication US 2020/0318944 which is incorporated by reference herein for all purposes. An advantage of the system shown in FIG. 4 is that such system allows one to match polarization for both detection arms (both detectors 121A and 121B) without requiring a PM fiber at the input to the PBS. The input fiber 123A for BPS 122A and input fiber 123B for PBS 122B can undergo different environmental perturbations, and yet the two PBSs can be used to get the desired polarization due to the accurate polarization control provided by the hybrid polarization controllers 10A and 10B.

Software Related Disclosure

At least certain aspects of the exemplary embodiments described herein can be realized or controlled by a computer of a system or apparatus that reads out and executes computer executable instructions (e.g., one or more programs or executable code) recorded on a storage medium (which may also be referred to as a 'non-transitory computer-readable storage medium') to perform functions of the polarization controller 10 described above. The computer may include various components known to a person having ordinary skill in the art. For example, the computer may include signal processor implemented by one or more circuits (e.g., a field programmable gate array (FPGA) or an application specific integrated circuit (ASIC)) for performing the functions of one or more of the above-described embodiment(s), by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)), and may include a network of separate computers or separate processors to read out and execute the computer executable instructions. The computer executable instructions may be provided to the computer, for example, from a cloud-based network or from the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. The computer may include an input/output (I/O) interface to receive and/or send communication signals (data) to input and output devices, which may include a keyboard, a display, a mouse, a touch screen, touchless interface (e.g., a gesture recognition device) a printing device, a light pen, an optical storage device, a scanner, a microphone, a camera, a drive, communication cable and a network (either wired or wireless).

The novel polarization controller disclosed herein provides several technical advantages over conventional polarization controllers known in the prior state of the art including, but not limited to: A fiber polarization controller with lower parts count, lower design complexity, and small size compared to conventional devices. The fiber polarization controller includes a hybrid mechanical and manual control module. In order to more precisely control polarization, and more rapidly achieve balance detection and optical diversity definition, the optical fiber travels substantially collinear and coaxial with the motor axis of the hollow shaft motor, and the fiber enters and exits each fiber paddle loop substantially tangential to the loop. The polarization is controlled by the design of the fiber paddle loop (diameter, fiber type, fiber core diameter, etc.), without actively applying pressure to the fiber; this reduces or prevents polarization mode dispersion.

<Modifications and Other Embodiments>

In referring to the description, specific details are set forth in order to provide a thorough understanding of the examples disclosed. In other instances, well-known methods, procedures, components and circuits have not been described in detail as not to unnecessarily lengthen the present disclosure. Unless defined otherwise herein, all technical and scientific terms used herein have the same meaning as commonly understood by persons of ordinary skill in the art to which this disclosure belongs. In that regard, breadth and scope of the present disclosure is not limited by the specification or drawings, but rather only by the plain meaning of the claim terms employed.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

What is claimed is:

1. A fiber optics polarization apparatus, comprising:
a hollow shaft motor having a motor body and a hallow shaft that spans through the motor body, the hollow shaft having a first end and a second end opposite to the first end;
a fiber paddle having a ring-shaped body with a substantially circular surface connected to a fiber-leading conduit formed substantially tangential to the circular surface, the fiber-leading conduit having a longitudinal axis and defining a first opening and a second opening along the longitudinal axis;
an optical fiber arranged through the motor body along a rotational axis of the hollow shaft motor entering through the first end and exiting through the second end of the hallow shaft, then entering the fiber paddle through the first opening, following the circular surface of the ring-shaped body, and exiting the circular surface through the second opening,
wherein the fiber paddle is configured to hold the optical fiber in a substantially circular loop along the circular surface and the optical fiber enters and exits the circular surface aligned substantially collinear with the longitudinal axis of the fiber-leading conduit, and
wherein the fiber paddle is attached to the second end of the hollow shaft, and the hollow shaft transfers rotational movement from the hollow shaft motor to rotate the fiber paddle about the longitudinal axis of the fiber-leading conduit so as to change a state of polarization (SOP) of light propagating through the optical fiber.

2. The fiber optics polarization apparatus according to claim 1, further comprising:
wherein the first end is a proximal end and the second end is a distal end, and
wherein the fiber paddle is directly affixed to the distal end of the hollow shaft and adapted to rotate with the hollow shaft about the rotational axis so as to change the SOP of light propagating through the optical fiber.

3. The fiber optics polarization apparatus according to claim 2, further comprising:
a support member configured to support the hollow shaft motor and the fiber paddle such that the hollow shaft motor and the fiber paddle are aligned collinear to each other so that a rotational axis of the hollow shaft motor and the longitudinal axis of the fiber-leading conduit are coincident with each other.

4. The fiber optics polarization apparatus according to claim 3, further comprising:
a plurality of fiber clamps configured to support the optical fiber at a corresponding plurality of support points,
wherein the plurality of fiber clamps support the optical fiber collinear with the longitudinal axis.

5. The fiber optics polarization apparatus according to claim 1,
wherein the fiber paddle includes a weight counterbalance configured to align a center of mass of the ring-shaped body with the rotational axis of the hollow shaft motor.

6. The fiber optics polarization apparatus according to claim 1,
wherein the fiber paddle is configured to be rotated automatically by the hollow shaft motor.

7. A fiber optics polarization controller, comprising:
a hollow shaft motor having a rotational axis and a hollow shaft, the hollow shaft having a bore that spans from a proximal end to a distal end through the hollow shaft motor substantially concentrically with the rotational axis;
a fiber paddle affixed to one end of the hollow shaft and adapted to rotate with the hollow shaft of the hollow shaft motor, the fiber paddle having a substantially circular surface connected to first and second openings formed substantially tangential to the circular surface; and
an optical fiber arranged through the hollow shaft motor entering through the proximal end and exiting through the distal end of the hollow shaft, then entering the fiber paddle through the first opening, following the circular surface of the fiber paddle, and exiting the circular surface through the second opening,
wherein the fiber paddle is configured to hold the optical fiber in a substantially circular loop along the circular surface, and
wherein the optical fiber, after passing through the hollow shaft motor, enters and exits the circular surface aligned substantially collinear with the rotational axis of the hollow shaft motor.

8. The fiber optics polarization controller according to claim 7,
wherein the circular surface of the fiber paddle is an inner circular surface adapted to support the optical fiber disposed along the inner circular surface.

9. The fiber optics polarization controller according to claim 8, further comprising:
a plurality of bosses protruding from the inner circular surface towards the center of the circular surface and adapted to guide and support the optical fiber along the inner circular surface.

10. The fiber optics polarization controller according to claim 7, further comprising:
a support member configured to hold the hollow shaft motor and the fiber paddle aligned collinearly with the rotational axis; and
a first fiber clamp arranged on a proximal side of the hollow shaft motor and a second fiber clamp arranged distally to the hollow shaft motor and after the first fiber paddle,
wherein the first fiber clamp and the second fiber clamp are attached to the support member arranged such that the optical fiber extends from the hollow shaft aligned collinearly with the rotational axis of the hollow shaft motor.

11. A fiber optics polarization controller comprising:
an optical fiber having a first end and a second end; and
a plurality of polarization stages,
wherein a first polarization stage comprises:
a hollow shaft motor having a hollow shaft, the hollow shaft spanning from a first end to a second end along a motor body of the hollow shaft motor and concentric with a rotational axis of the hollow shaft motor; and
a first fiber paddle affixed to and adapted to rotate with the hollow shaft,
wherein the first fiber paddle has a ring-shaped body with two openings arranged opposite to each other around the ring-shaped body,
wherein a first opening of the first fiber paddle is directly connected to one end of the hallow shaft substantially collinear with the rotational axis of the hollow shaft motor, and the second opening of the first fiber paddle is arranged collinear with the hallow shaft and also substantially collinear with the rotational axis of the hollow shaft motor, and wherein the optical fiber is arranged spanning through the hollow shaft motor along a bore of the hollow shaft, entering the first fiber paddle through the first opening thereof, following around the ring-shaped body to form a first fiber loop, and exiting the ring-shaped body of the first fiber paddle through the second opening thereof.

12. The fiber optics polarization controller according to claim 11, further comprising:
a second polarization stage comprising:
a second fiber paddle having a ring-shaped body with a-two openings arranged opposite to each other around the ring-shaped body, wherein a first opening of the second fiber paddle is arranged distal to the second opening of the first fiber paddle and substantially collinear with the rotational axis of the hollow shaft motor, and the second opening of the second fiber paddle is arranged distal to and collinear with the second opening of the first fiber paddle and also collinear with the rotational axis of the hollow shaft motor, and
wherein the optical fiber is further arranged spanning between the first fiber paddle and the second fiber paddle, entering the second fiber paddle through the first opening thereof, following around the ring-shaped body of the second fiber paddle to form a second fiber loop, and exiting the ring-shaped body of the second fiber paddle through the second opening thereof.

13. The fiber optics polarization controller according to claim 12,
wherein the first and second openings of the first or second fiber paddles are arranged around the ring-shaped body opposite to each other and substantially tangential to the ring-shaped body.

14. The fiber optics polarization controller according to claim 12,
wherein the first and second openings of the first or second fiber paddles can be arranged diametrically opposite to each other around the ring-shaped body.

15. The fiber optics polarization controller according to claim 12,
wherein the ring-shaped body of the first or second fiber paddle includes a circular inner surface adapted to support the optical fiber disposed along the circular inner surface to form the first or second fiber loop, or
wherein the ring-shaped body of the first or second fiber paddle includes a circular outer surface adapted to support the optical fiber disposed along the outer surface to form the first or second fiber loop.

16. The fiber optics polarization controller according to claim 15,
wherein the ring-shaped body of the first or second fiber paddles includes a plurality of bosses protruding radially inward from the circular inner surface towards the center of the circular surface and adapted to guide and support the optical fiber along the circular inner surface.

17. The fiber optics polarization controller according to claim 15,
wherein the ring-shaped body of the first or second fiber paddles includes a plurality of bosses protruding radially outward from the circular outer surface and adapted to guide and support the optical fiber along the circular outer surface.

18. A multi-stage fiber optics polarization controller, comprising:
an optical fiber configured to transmit light;
a first polarization stage comprising:
a hollow shaft motor having a rotational axis a hollow shaft, the hollow shaft spanning through the hollow shaft motor concentrically with the rotational axis from a proximal end to a distal end, and
a first fiber paddle directly affixed to the distal end of the hollow shaft and adapted to rotate with the hollow shaft about the rotational axis;
a second polarization stage comprising:
a second fiber paddle arranged distal to the first fiber paddle and adapted to rotate independently from the rotary motor and independently from the first fiber paddle,
wherein the first fiber paddle and the second fiber paddle both have a ring-shaped body with a substantially circular surface connected to a fiber-leading conduit formed substantially tangential to the circular surface, the fiber-leading conduit having a longitudinal axis and defining a first opening and a second opening along the longitudinal axis,
wherein the optical fiber is arranged through the hollow shaft motor along a bore of the hollow shaft, enters the first fiber paddle through the first opening, follows the circular surface of the ring-shaped body, and exits the first fiber paddle through the second opening thereof, thereafter the optical fiber enters the second fiber paddle through the first opening of the second fiber paddle, follows the circular surface of the ring-shaped body of the second fiber paddle, and exits the second fiber paddle through the second opening thereof,
wherein the optical fiber, after passing thorough the hollow shaft motor, enters and exits the first fiber paddle and the second fiber paddle aligned substantially collinear with the longitudinal axis of the fiber-leading conduit and collinear with the rotational axis of the hollow shaft motor, and
wherein rotation of the first fiber paddle and/or rotation of the second fiber paddle about the longitudinal axis changes a state of polarization (SOP) of the light transmitted through the optical fiber.

19. The multi-stage fiber optics polarization controller, according to claim 18, further comprising:
a plurality of bosses arranged staggered on either side of the circular surface and adapted to firmly hold the optical fiber against the circular surface,
wherein the circular surface of the first or second fiber paddle includes a circular inner surface adapted to support the optical fiber disposed along the circular inner surface to form the first or second fiber loop, or
wherein the circular surface of the first or second fiber paddle includes a circular outer surface adapted to support the optical fiber disposed along the outer surface to form the first or second fiber loop.

20. The multi-stage fiber optics polarization controller, according to claim 18, further comprising a processor operatively connected to the hollow shaft motor,
wherein, to change the SOP of light transmitted through the optical fiber, the first polarization stage is automatically controlled by the processor to rotate the first fiber paddle and the second polarization stage is manually controlled by a user to rotate the second fiber paddle.

* * * * *